United States Patent
Hu

(10) Patent No.: US 10,057,969 B2
(45) Date of Patent: Aug. 21, 2018

(54) STARTING DEVICE FOR A CDM LAMP AND STARTING METHOD FOR THE SAME

(71) Applicants: Jun Hu, Guangzhou, Guangdong (CN); Jian Huang, Guangzhou, Guangdong (CN)

(72) Inventor: Jun Hu, Guangdong (CN)

(73) Assignee: GUANGZHOU TRIZ INFORMATION TECHNOLOGY LTD., Guangzhou (CN)

( * ) Notice: Subject to any disclaimer, the term of this patent is extended or adjusted under 35 U.S.C. 154(b) by 0 days.

(21) Appl. No.: 15/393,615

(22) Filed: Dec. 29, 2016

(65) Prior Publication Data

US 2017/0215263 A1    Jul. 27, 2017

(30) Foreign Application Priority Data

Oct. 29, 2015 (CN) .......................... 2015 1 07288086

(51) Int. Cl.
H05B 37/00 (2006.01)
H05B 41/298 (2006.01)
H02M 1/42 (2007.01)

(52) U.S. Cl.
CPC ...... *H05B 41/2988* (2013.01); *H02M 1/4208* (2013.01)

(58) Field of Classification Search
CPC .................. H05B 41/2988; H02M 1/4208
USPC ...................................... 315/200 R
See application file for complete search history.

(56) References Cited

U.S. PATENT DOCUMENTS

| 4,151,610 A | 4/1979 | Suzuki et al. | |
|---|---|---|---|
| 2006/0197470 A1* | 9/2006 | Ribarich | H05B 41/2885 315/291 |
| 2009/0315470 A1* | 12/2009 | Kumagai | H05B 41/2882 315/224 |
| 2013/0038216 A1* | 2/2013 | Hao | H05B 41/36 315/132 |
| 2013/0257301 A1* | 10/2013 | Tran | C01B 13/115 315/200 R |

(Continued)

FOREIGN PATENT DOCUMENTS

| CN | 16358123 | 7/2005 |
|---|---|---|
| CN | 101742802 A | 6/2010 |
| CN | 102892247 A | 1/2013 |

*Primary Examiner* — Don Le
(74) *Attorney, Agent, or Firm* — Dragon Sun Law Firm, P.C.; Jinggao Li, Esq.

(57) ABSTRACT

The present disclosure relates to a starting device for a CDM lamp, comprising: a full-bridge inverter, which at least provides an output as a starting power source to initiate the CDM lamp to work normally; a driving circuit for driving the full-bridge inverter; a single-chip microcomputer, which is connected to the driving circuit; an ignition determining module, one end of which is connected to the full-bridge inverter to sense whether the output of the full-bridge inverter has powered on the CDM lamp, so as to determine whether ignition of the CDM lamp succeeds and then output a result of the determining to the single-chip microcomputer via the other end. The present disclosure provides a novel starting device for a CDM lamp, which facilitates determining whether starting of the CDM lamp succeeds and also facilitates enhancement of successful rate of starting the CDM lamp subsequently.

14 Claims, 3 Drawing Sheets

(56) References Cited

U.S. PATENT DOCUMENTS

2016/0205754 A1\* 7/2016 Rapson .............. H05B 41/2883
　　　　　　　　　　　　　　　　　　　　　　　315/112

\* cited by examiner

STARTING DEVICE FOR A CDM LAMP AND STARTING METHOD FOR THE SAME

FIELD OF THE INVENTION

The present invention relates to the field of lighting, and particularly relates to a starting device for a CDM lamp and a starting method for the same.

BACKGROUND OF THE INVENTION

Ceramic discharge metal-halide (CDM) lamps, i.e., CDM lamps (also referred to as ceramic metal halide lamps, or ceramic metal halide lamps), are commonly referred to as ceramic metal halide (CMH) lamps. Although the CDM lamps have an excellent performance, as their illumination time elapses, they become increasingly demanding on the voltage needed for starting; consequently, they possibly cannot be started by original starting circuits before reaching a theoretical service life, while the light source per se of the CDM lamp is not damaged yet.

In addition, the prior art has the following situation: when a CDM light source is about 5 m or more distant away from its power supply module, the CDM light source possibly cannot not be illuminated. Because the CDM lamp is relatively demanding on the voltage to start, a common power source or a common starting device, when being distant away from the light source beyond a certain distance, will not illuminate the CDM light source.

In other words, CDM lamps are very demanding on their starting conditions. Existing starting devices for CDM lamps hamper normal use of the CDM lamps.

SUMMARY OF THE INVENTION

In view of the above problems, the present disclosure provides a starting device for a CDM lamp, characterized in that the starting device comprises:

a full-bridge inverter, which at least provides an output as a starting power source to start the CDM lamp to work normally;

a driving circuit for driving the full-bridge inverter;

a single-chip microcomputer, which is connected to the driving circuit;

an ignition determining module, one end of which is connected to the full-bridge inverter to sense whether the output of the full-bridge inverter has powered on the CDM lamp, so as to determine whether ignition of the CDM lamp succeeds and then output a result of the determining to the single-chip microcomputer via the other end; wherein:

if the single-chip microcomputer knows that the ignition succeeds, then the single-chip microcomputer controls the driving circuit to regulate the output of the full-bridge inverter so that the CDM lamp enters into a normal working state from a starting state;

otherwise: in a preset time limit which allows multiple attempts of CDM lamp ignition, the single-chip microcomputer controls the driving circuit to regulate the output of the full-bridge inverter once every certain time, till the single-chip microcomputer knows that the ignition succeeds; if the ignition fails always and exceeds the time limit of ignition, the single-chip microcomputer switches off the driving circuit and suspends starting of the CDM lamp.

Meanwhile, the present disclosure further provides a starting method for a CDM lamp, wherein, the starting method is applied to a starting device for the CDM lamp, the starting device comprises a full bridge inverter connected to the CDM lamp, a driving circuit, a single-chip microcomputer and an ignition determining module; characterized in that the starting method specifically comprises steps below:

S100: when the starting device is powered up, detecting whether a DC input voltage is present at an input side of the full-bridge inverter; if not, determining that the input side of the full-bridge inverter is abnormal; if present, proceeding to next step;

S200: if the DC input voltage is present at the input side of the full-bridge inverter, the driving circuit being controlled by the single-chip microcomputer; within a set time length T0, continuously outputting, according to a certain set period, pulse of the period, so that the full-bridge inverter provides output to the CDM lamp;

S300: determining, by the ignition determining module, whether the output provided by the full-bridge inverter within the time length T0 successfully ignites the CDM lamp, and outputting, by the ignition determining module, a result of the determining to the single-chip microcomputer;

S400: if the single-chip microcomputer knows that the ignition succeeds through the step S300, controlling, by the single-chip microcomputer the driving circuit to regulate the output of the full-bridge inverter, so that the CDM lamp enters into a normal working state from a starting state;

S500: if the single-chip microcomputer knows that the ignition failed through the step S300 and the DC input voltage is still present at the input side of the full-bridge inverter, the drive circuit being still controlled by the single-chip microcomputer; changing the previously set period, and continuously outputting, according to the changed set period within the time length T0, pulse of the period, so that the full-bridge inverter provides a new output to the CDM lamp; then, continuing to execute step S300; if the ignition determining module still determines that the ignition failed, executing step S600; otherwise, jumping to step S400;

S600: accumulating the time length T0 in the executed step S500 and the time length T0 in the executed step S200, and determining whether the accumulated time length has exceeded a preset total time length T; if not, iteratively executing the step S500; otherwise, switching off pulse output of the driving circuit, confirming that a starting time-out fault is present, and transmitting an alert of starting time-out fault to the single-chip microcomputer.

The present disclosure has the following features: in a preset time limit which allows multiple attempts of igniting the CDM lamp, the present disclosure is capable of implementing multiple attempts of ignition by continuously regulating output of the full-bridge inverter till ignition succeeds or time out to exit from the ignition, thereby improving a success rate of starting the CDM lamp.

BRIEF DESCRIPTION OF THE ACCOMPANYING DRAWINGS

DETAILED DESCRIPTION OF THE PREFERRED EMBODIMENTS

Figure 1:
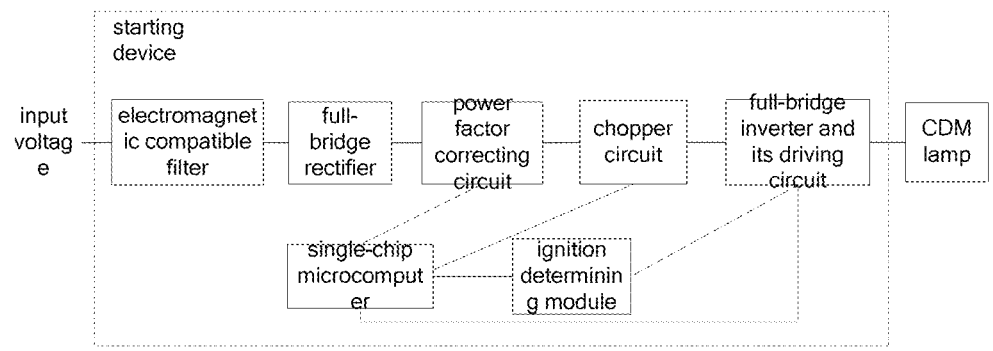
FIG. 1 is a schematic diagram of one embodiment in the present disclosure.

Each embodiment in the present specification is described in a progressive manner, focusing on differences from other embodiments; same or similar parts between various embodiments may be referenced with one another.

In an embodiment, there is disclosed a starting device for a CDM lamp, the starting device comprising:

a full-bridge inverter, which at least provides an output as a starting power source to initiate the CDM lamp to work normally;

a driving circuit for driving the full-bridge inverter;

a single-chip microcomputer, which is connected to the driving circuit;

an ignition determining module, one end of which is connected to the full-bridge inverter to sense whether the output of the full-bridge inverter has powered on the CDM lamp, so as to determine whether ignition of the CDM lamp succeeds and then output a result of the determining to the single-chip microcomputer via the other end; wherein:

if the single-chip microcomputer knows that the ignition succeeds, then the single-chip microcomputer controls the driving circuit to regulate the output of the full-bridge inverter so that the CDM lamp enters into a normal working state from a starting state;

otherwise: in a preset time limit which allows multiple attempts of CDM lamp ignition, the single-chip microcomputer controls the driving circuit to regulate the output of the full-bridge inverter once every certain time, till the single-chip microcomputer knows that the ignition succeeds; if the ignition fails always and exceeds the time limit of ignition, the single-chip microcomputer switches off the driving circuit and suspends starting of the CDM lamp.

For this embodiment, the full-bridge inverter is utilized to provide AC power to the CDM lamp. A most unique part of the embodiment is that the single-chip microcomputer is utilized o control the driving circuit of the full-bridge inverter, such that when the ignition fails, the single-chip microcomputer will attempt to re-ignite by regulating the output of the full-bridge inverter as long as within the allowed time limit of attempt; in the case of failing again, the single-chip microcomputer may attempt again to re-ignite by regulating the output of the full-bridge inverter as long as within the allowed time limit of attempt. Each output of the full-bridge inverter is controlled by the driving circuit, while the driving circuit can be controlled by the single chip microcomputer.

As far as regulating the output of the full-bridge inverter is concerned, a common technical means may consider PWM modulation, i.e., pulse width modulation. In addition to regulating the pulse width, period may also be regulated to regulate the output of the full-bridge inverter. Naturally, the single-chip microcomputer may also regulate the output of the full-bridge inverter by controlling the driving circuit.

For the embodiment, in order to facilitate understanding, it is assumed that after the starting device is powered on, the output of the full-bridge inverter is initially controlled by a default PWM waveform of the driving circuit;

Suppose the driving circuit initially continuously outputs a PWM waveform with a period of 666 ms and a duration of 5 s according to an instruction/parameter of the single-chip microcomputer. Correspondingly, the full-bridge inverter continuously outputs an output within 5 s, with a purpose of attempting to ignite the CDM lamp;

Suppose the CDM lamp is not illuminated, i.e., no current flows from the load (i.e., the CDM lamp), the CDM lamp ignition fails; moreover, the ignition determining module knows that the ignition fails and transmits a result of ignition failure to the single-chip microcomputer;

After the single-chip microcomputer knows that the ignition fails, because the accumulated ignition time 5 s does not exceed a preset 20 s time limit for ignition, supposing the single-chip microcomputer needs to regulate an output voltage of the full-bridge inverter to attempt to re-ignite the CDM lamp according to a preset ignition policy, the single-chip microcomputer transmits an instruction/parameter to the driving circuit to order it to change the output of the full-bridge inverter;

Suppose the driving circuit continuously outputs a PWM waveform with a period of 77 ms and still a duration of 5 s according to an instruction/parameter of the single-chip microcomputer. Correspondingly, the full-bridge inverter continuously outputs another output within 5 s, with a purpose to attempt to re-ignite the CDM lamp;

Suppose the CDM lamp is not illuminated again, i.e., no current flows through the load (i.e., the CDM lamp), then the CDM fails to be ignited; within the 5 s, suppose the ignition determining module determines whether the ignition succeeds through presence/absence of a current value, e.g., the ignition determining module does not obtain any current value flowing through the CDM lamp, then the ignition determining module knows that the ignition fails, and transmits a result of ignition failure to the single-chip microcomputer;

After the single-chip microcomputer knows again that the ignition fails, because although the accumulated ignition time reaches 10 s, it still does not exceed a preset 20 s time limit for ignition, suppose the single-chip microcomputer needs to regulate the output voltage of the full-bridge inverter according to a preset ignition policy to attempt again to ignite the CDM lamp, then the single-chip microcomputer transmits an instruction/parameter to the driving circuit to order it to change the output of the full-bridge inverter;

Suppose the driving circuit continuously outputs a PWM waveform with a period of 888 ms and still a duration of 5 s according to an instruction/parameter of the single-chip microcomputer. Correspondingly, the full-bridge inverter continuously outputs a further output within 5 s, with a purpose to re-attempt to ignite the CDM lamp;

At this time, the CDM lamp is illuminated, and current also correspondingly flows through the CDM. The single-chip microcomputer knows that the ignition succeeds through the ignition determining module; then the single-chip microcomputer may further control the driving circuit to regulate output of the full-bridge inverter, such that the CDM lamp enters into a normal working state from a starting state; then, the full-bridge inverter further regulates an appropriate output under control of the single-chip microcomputer, such that the CDM lamp can smoothly enters into the normal working state.

It is easily understood that after multiple attempts of ignition, if the accumulated time limit of ignition attempts exceeds the 20 s in the example, the single-chip microcomputer will switch off the driving circuit and suspend starting of the CDM lamp. For the total time limit of 20 s and multiple changes of the period of the PWM waveform from 666 ms to 777 ms and to 888 ms, such preset ignition policy may be completely determined based on experimental study and statistical analysis of tube voltage when the CDM lamp is started. Even a new kind of CDM lamp emerges, the pre-set ignition policy may also be updated. Therefore, without a fault, after all ignition policies have been executed, the CDM lamp will be surely illuminated successfully. Otherwise, it indicates that a certain fault is surely present in a line, starting device, or CDM lamp.

As far as PWM modulation is concerned, it may regulate an output voltage of the inverter and/or an output pulse width of the inverter.

The embodiment above may enhance energy density by regulating the output voltage and/or pulse width of the full-bridge inverter so as to attempt to re-ignite when the ignition does not succeed; if no fault is present, the embodiment above can solve the problem that in the prior art, due to elapse of the time of using the CDM lamp, the original conventional starting device cannot illuminate the CDM lamp, and can also solve the problem that the CDM lamp cannot be easily illuminated when the light source is more than 5 m distant away from the conventional starting device.

Preferably, when re-attempting the ignition, not only the output voltage of the full-bridge inverter is raised, but also the output pulse width of the full-bridge inverter is simultaneously raised, so as to obtain a higher energy density, which facilitates a successful ignition as early as possible. For example, in the first ignition, with an output voltage of 50V, a pulse of 666 ms is continuously output for 5 s; however, the ignition does not succeed; in re-ignition, the output voltage is regulated to 70V, and a pulse of 777 ms is continuously output for 5 s; then the ignition succeeds.

The parameters/instructions involved in the ignition policies above may be pre-stored in a memory of the single-chip microcomputer in a form of database or in other form of appropriate data storage. The single-chip microcomputer will access relevant parameters and instructions when necessary.

In addition, the ignition determining module may be a hardware module, e.g., a certain chip and its supporting peripheral circuit; the ignition determining module may also be a software module that utilizes the processing capability of the single-chip microcomputer per se and its supporting peripheral circuit. It is easily understood that the supporting peripheral circuit at least has a capability of sensing current flowing through the CDM lamp and a capability of feeding back the sensed current value information to the ignition determining module, so as to be available for the single-chip microcomputer to select an appropriate processing manner from a preset ignition policy.

In another embodiment, the starting device further comprises: a chopper circuit, an output end of which is connected to the full-bridge inverter so as to provide input to the full-bridge inverter, and a control end of which is connected to the single-chip microcomputer such that the single-chip microcomputer can regulate output of the chopper circuit.

For this embodiment, the chopper circuit may provide a DC input to the full-bridge inverter. In addition, each time the single-chip microcomputer controls the driving circuit, resulting in change of the output of the full-bridge inverter, the input of the full-bridge inverter will have an appropriate input range. The input range may cause output of the full-bridge inverter desired to be implemented by the single-chip microcomputer regardless of how the driving circuit regulates the output. Therefore, in order to utilize electricity more efficiently, the single-chip microcomputer may also control output of the chopper circuit, as long as the output of the chopper circuit can satisfy the regulation requirements of the full-bridge inverter. Therefore, the embodiment also introduces regulating the chopper circuit by the single-chip microcomputer.

For this embodiment, the single-chip machine not only regulates the driving circuit and the full-bridge inverter, but also may regulate the chopper circuit. The embodiment may also cause that each time the single-chip microcomputer regulates the chopper circuit, the output of the chopper circuit exactly satisfies the regulating objective of the single-chip machine with respect to the full-bridge inverter. In this case, the embodiment can achieve efficient regulation of the chopper circuit and the full-bridge inverter, and meanwhile guarantees efficient utilization of the electrical energy.

In another embodiment, when current flows through the CDM lamp, the ignition determining module can sense the current flowing through the CDM lamp and/or obtain tube voltage of the CDM lamp. This means whether the ignition succeeds may be determined through the current or tube voltage. For example, when there is current flowing, the CDM lamp is powered on, and corresponding tube voltage is also present in the CDM lamp; when no current flows, the CDM lamp is not powered on, and the load (i.e., the CDM lamp) is equivalent to being in an open state, and no corresponding tube voltage is present in the CDM lamp.

In a further embodiment, the starting device further comprises: a full-bridge rectifier which provides an output for the chopper circuit to use. It is easily understood that the full-bridge rectifier provides a DC output for the chopper circuit to use.

In another embodiment, the starting device further comprises: a power factor correcting circuit, an input end of which is connected to an output end of the full-bridge rectifier, while a bus line voltage output end of which is connected to an input end of the chopper circuit; moreover, the power factor correction circuit is controlled by the single-chip microcomputer.

For this embodiment, the power factor correction circuit not only plays its inherent role (e.g., raising power factors of the line or system, reducing harmonic content, etc.), but also plays a special role for the embodiment: because the power factor correction circuit is controlled by the single-chip machine, the starting device is not only able to be interfaced with CDM lamps of different optimal tube voltages, it is also guaranteed that the single-chip microcomputer can still timely regulate the power factor correction circuit when being interfaced with the CDM lamps of different optimal voltages, ensuring that the power factor is always controlled at a level close to 1.

In another embodiment, the starting device further comprises an electromagnetic compatible filter, one end of which is connected to a mains supply, while the other end of which provides an output for the full-bridge rectifier to use. The electromagnetic compatible filter can inhibit electromagnetic interference in the present embodiment.

In another embodiment, the starting device further comprises: a fault displaying module which can display fault information to alert the user whether an input side of the full-bridge inverter has abnormalities.

For example, when an abnormality exists, for this embodiment, if the input side of the full-bridge inverter has no voltage or the voltage is substandard, the single-chip microcomputer may determine that the input side of the full-bridge inverter has an abnormality according to a database in the memory, and transmit the fault information with respect to this fault to the fault displaying module.

Furthermore, if the output side of the full-bridge inverter is open-circuit or short-circuit, or the working temperature of the starting device per se exceeds a secure range, the fault information may also be transmitted to the fault displaying module after being sensed by a current sensor or a NTC temperature sensor or the like.

In a further embodiment, refer to FIG. 1, which shows a starting device for a CDM lamp, comprising an electromagnetic compatible filter, a full-bridge rectifier, a power factor correction circuit, a chopper circuit, a full-bridge inverter and its driving circuit, a CDM lamp, a single-chip microcomputer, and an ignition determining module. A trigger of the CDM lamp is not shown.

In addition, in an embodiment, the present disclosure also discloses a starting method for a CDM lamp, wherein, the starting method is applied to a starting device for the CDM lamp, the starting device comprises a full bridge inverter connected to the CDM lamp, a driving circuit, a single-chip microcomputer and an ignition determining module; characterized in that the starting method specifically comprises steps below:

S100: when the starting device is powered up, detecting whether a DC input voltage is present at an input side of the full-bridge inverter; if not, determining that the input side of the full-bridge inverter is abnormal; if present, proceeding to next step;

S200: if the DC input voltage is present at the input side of the full-bridge inverter, the driving circuit being controlled by the single-chip microcomputer; within a set time length T0, continuously outputting, according to a certain set period, pulse of the period, so that the full-bridge inverter provides output to the CDM lamp;

S300: determining, by the ignition determining module, whether the output provided by the full-bridge inverter within the time length T0 successfully ignites the CDM lamp, and outputting, by the ignition determining module, a result of the determining to the single-chip microcomputer;

S400: if the single-chip microcomputer knows that the ignition succeeds through the step S300, controlling, by the single-chip microcomputer the driving circuit to regulate the output of the full-bridge inverter, so that the CDM lamp enters into a normal working state from a starting state;

S500: if the single-chip microcomputer knows that the ignition failed through the step S300 and the DC input voltage is still present at the input side of the full-bridge inverter, the drive circuit being still controlled by the single-chip microcomputer; changing the previously set period, and continuously outputting, according to the changed set period within the time length T0, pulse of the period, so that the full-bridge inverter provides a new output to the CDM lamp; then, continuing to execute step S300; if the ignition determining module still determines that the ignition failed, executing step S600; otherwise, jumping to step S400;

S600: accumulating the time length T0 in the executed step S500 and the time length T0 in the executed step S200, and determining whether the accumulated time length has exceeded a preset total time length T; if not, iteratively executing the step S500; otherwise, switching off pulse output of the driving circuit, confirming that a starting time-out fault is present, and transmitting an alert of starting time-out fault to the single-chip microcomputer.

For this embodiment, in conjunction with the embodiments above regarding the starting device, it is easily understood that T0 therein may correspond to the abovementioned 5 s (of course, there may also be other reasonable setting, e.g., in a range of 4-10 s), and the preset total time length T may correspond to the abovementioned 20 s. For this embodiment, a full-bridge inverter is utilized to provide AC power source to the CDM lamp. A most unique part of the embodiment is that the single-chip microcomputer is utilized o control the driving circuit of the full-bridge inverter, such that when the ignition fails, the single-chip microcomputer will attempt to re-ignite by regulating the output of the full-bridge inverter as long as within the allowed time limit of attempt; in the case of failing again, the single-chip microcomputer may attempt again to re-ignite by regulating the output of the full-bridge inverter as long as still within the allowed time limit of attempt. For the method disclosed in the embodiment, it comprises an iterative process. Each time the full-bridge inverter outputs, it is controlled by the driving circuit, while the driving circuit can be controlled by the single-chip microcomputer.

In another embodiment, the DC input voltage in the step S100 is provided through an output of the chopper circuit, and the single-chip microcomputer can regulate the output of the chopper circuit.

In a further embodiment, in the step S300, when current flows through the CDM lamp, the ignition determining module can sense current flowing through the CDM lamp and/or obtain a tube voltage of the CDM lamp.

In another embodiment, an input of the chopper circuit is a DC current, and the DC current is obtained through an output of the full-bridge rectifier.

In another embodiment, the starting device further comprises a power factor correcting circuit, an input end of which is connected to an output end of the full-bridge rectifier, while a bus line voltage output end of which is connected to an input end of the chopper circuit; moreover, the power factor correction circuit is controlled by the single-chip microcomputer.

In another embodiment, the starting device further comprises an electromagnetic compatible filter, one end of which is connected to a mains supply, while the other end of which provides an output for the full-bridge rectifier to use.

In another embodiment, the starting device further comprises: a fault displaying module which can display fault information to alert the user whether an input side of the full-bridge inverter has abnormalities.

Figure 2:
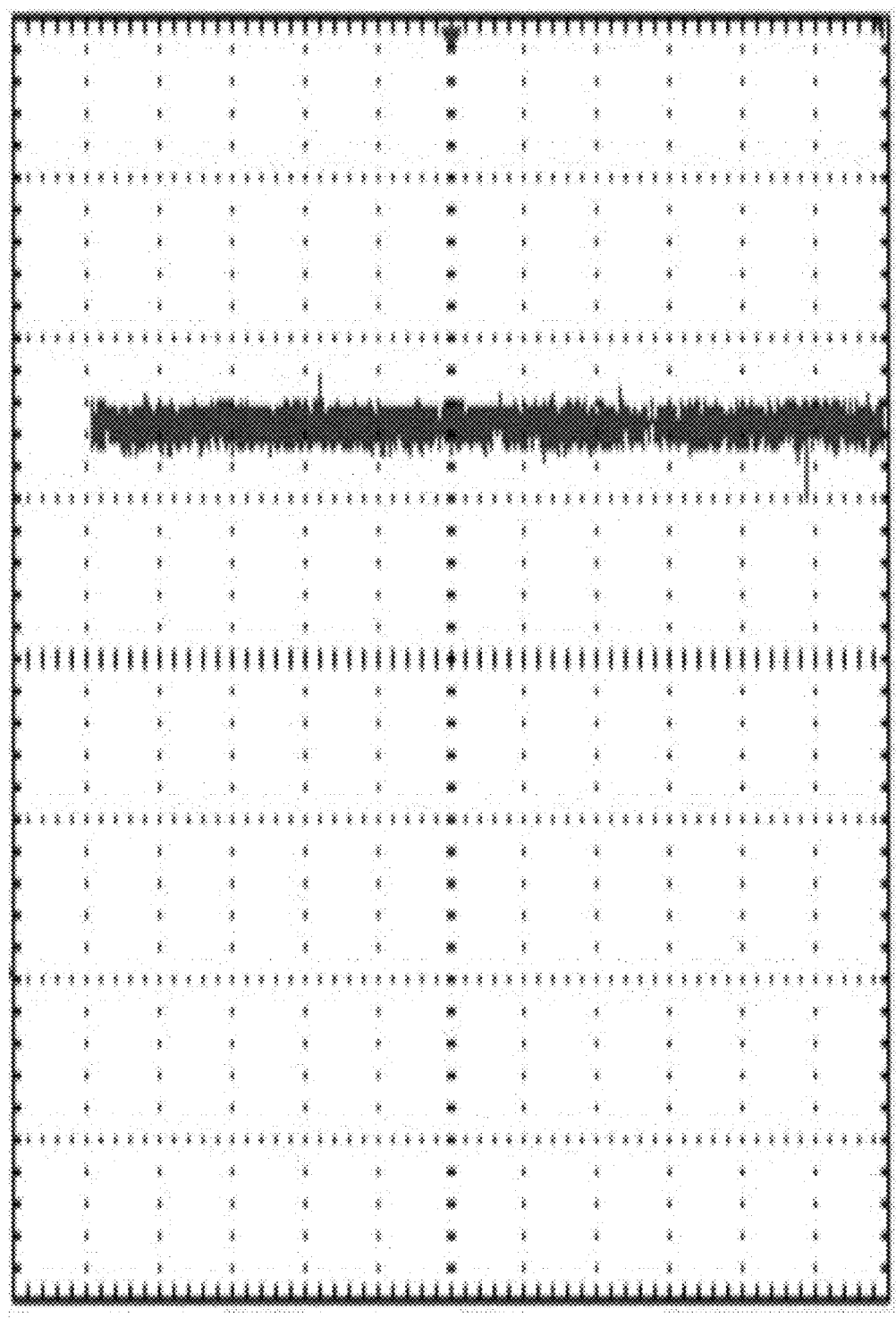
FIG. 2 is a schematic diagram of real-time sampling in the present disclosure.
Figure 3:
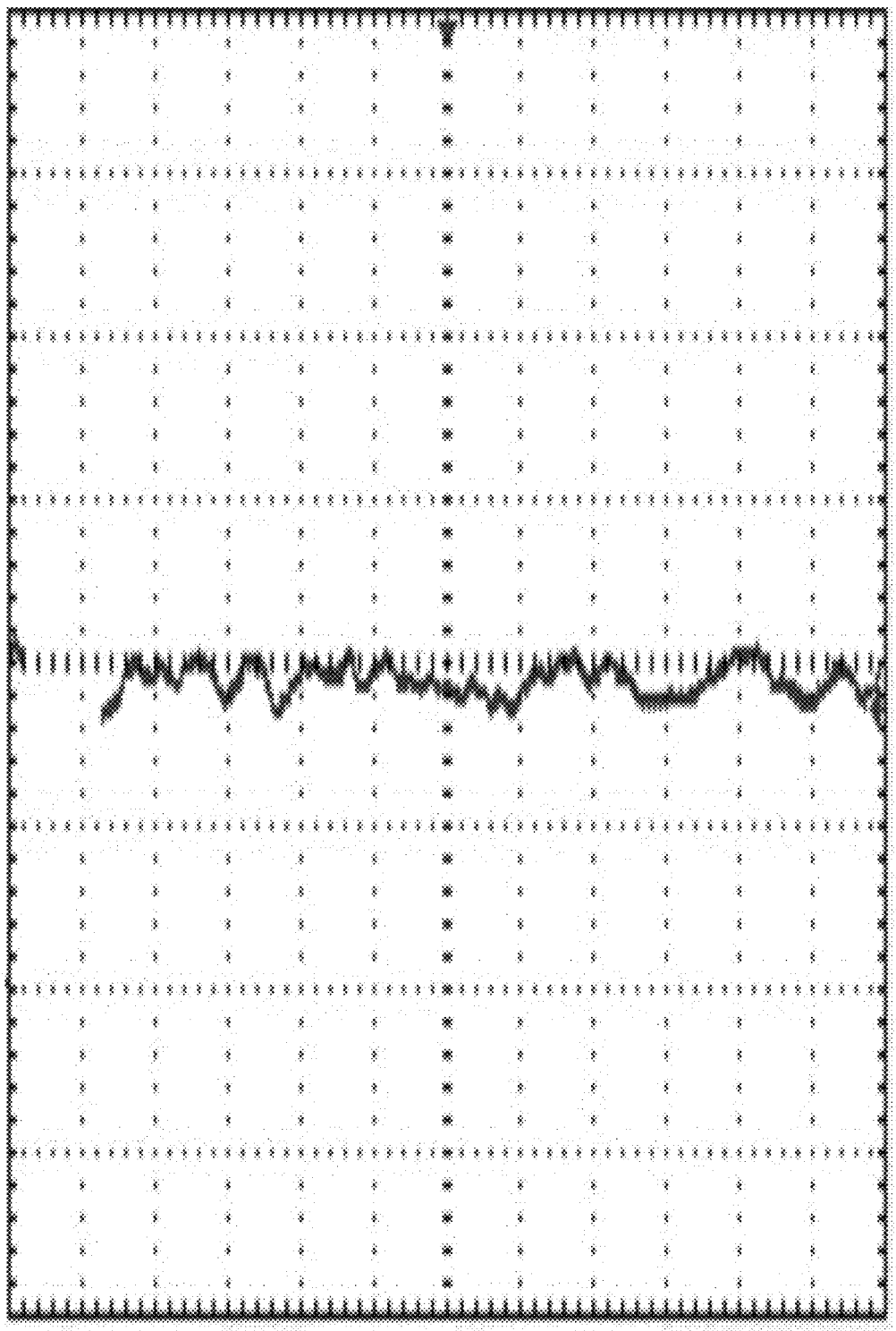
FIG. 3 is a waveform diagram after sensed data obtained from the real-time sampling are processed through fuzzy operation.

For various embodiments disclosed above, it is possibly needed to acquire in real time the current flowing through the CDM lamp in a very short time during transition from successful ignition to a normal working state so as to feed back the measured current to the single-chip microcomputer to regulate the output of the full-bridge inverter. Suppose the following hexadecimal data are real-time AD sampling values measured in several seconds, as shown in FIG. 2, which reflects real-time dynamic characteristics of the current flowing through the CDM lamp:

For the sampling data above and what are shown in FIG. 2, they substantially vary in a range of 80-9F, and the waveform vibration amplitude range substantially has no change. Supposing all other sampling data satisfying the data change rules above correspond to a certain corresponding value of a certain real-time current in the database, after performing a fuzzy operation, may determine that the present CDM current is in a state of being a corresponding value in the database. FIG. 3 shows a fuzzy operation-processed waveform of the sensed data obtained from the real-time sampling. The relevant processing unit of the single-chip microcomputer emits a control signal to the driving circuit after comparing the data represented by such kind of waveforms with the database. Similarly, if other real-time sampling is involved, the present disclosure may also consider a technical means of adopting fuzzy operation and comparing with the database so as to emit a control signal.

The starting device and method for a CDM lamp provided by the present disclosure have been detailed above. In the present disclosure, specific examples are applied to expound the principle and embodiments of the present disclosure. Illustration of the embodiments above is only to facilitate understanding of the method of the present disclosure and its core idea. Meanwhile, to those skilled in the art, various may be made to the preferred embodiments and application scope according to the idea of the present invention. In view of the above, the content of the present disclosure should not be understood as limiting the present invention.

The invention claimed is:

1. A starting device for a Ceramic Discharge Metal-halide (CDM) lamp comprising:
    a full-bridge inverter, which at least provides an output as a starting power source to initiate the CDM lamp to work normally;
    a driving circuit for driving the full-bridge inverter and for continuously outputting a Pulse Width Modulation (PWM) waveform to regulate the full-bridge inverter continuously;
    a single-chip microcomputer, which is connected to the driving circuit;
    an ignition determining module, one end of which is connected to the full-bridge inverter to sense whether the output of the full-bridge inverter has powered on the CDM lamp, so as to determine whether ignition of the CDM lamp succeeds and then output a result of the determining to the single-chip microcomputer via the other end, wherein the single-chip microcomputer, the ignition determining module and the full-bridge inverter are three separate and distinct components that are not integrated into one part; and wherein:
    if the single-chip microcomputer knows that the ignition succeeds, then the single-chip microcomputer controls the driving circuit to regulate the output of the full-bridge inverter so that the CDM lamp enters into a normal working state from a starting state;
    otherwise: in a preset time limit which allows multiple attempts of CDM lamp ignition, the single-chip microcomputer controls the driving circuit to regulate the output of the full-bridge inverter once every certain time, till the single-chip microcomputer knows that the ignition succeeds; if the ignition fails always and exceeds the time limit of ignition, the single-chip microcomputer switches off the driving circuit and suspends starting of the CDM lamp, wherein
    during each of the multiple attempts of the CDM lamp ignition, an output voltage and an output pulse width of the full-bridge inverter are simultaneously raised so as to obtain an enhanced energy density for facilitating the ignition;
    the ignition determining module senses real-time current flowing through the CDM lamp to obtain real-time sampling data represented by the PWM waveform;
    a fuzzy operation is performed to obtain a fuzzy operation-processed waveform of sensed data obtained from the real-time sampling and to determine that a present CDM current represented by the fuzzy operation-processed waveform is in a state of being a corresponding value in a database; and
    the single-chip microcomputer emits a control signal to control the driving circuit after determining that the present CDM current is in the state of the corresponding value in the database.

2. The starting device according to claim 1, further comprising: a chopper circuit, wherein the chopper circuit comprises an output end that is connected to the full-bridge inverter so as to provide input to the full-bridge inverter, and a control end that is connected to the single-chip microcomputer such that the single-chip microcomputer can regulate output of the chopper circuit.

3. The starting device according to claim 1, wherein when current flows through the CDM lamp, the ignition determining module can sense the current flowing through the CDM lamp, and/or obtaining a tube voltage of the CDM lamp.

4. The starting device according to claim 2, further comprising: a full-bridge rectifier which provides an output for the chopper circuit to use.

5. The starting device according to claim 4, further comprising: a power factor correcting circuit, wherein an input end of which is connected to an output end of the full-bridge rectifier, while a bus line voltage output end of which is connected to an input end of the chopper circuit; and wherein the power factor correction circuit is controlled by the single-chip microcomputer.

6. The starting device according to claim 4, further comprising: a fault displaying module which can display fault information to alert the user whether an input side of the full-bridge inverter has abnormalities.

7. A starting method for a Ceramic Discharge Metal-halide (CDM) lamp, wherein the starting method is applied to a starting device for the CDM lamp, the starting device comprises a full bridge inverter connected to the CDM lamp, a driving circuit, a single-chip microcomputer and an ignition determining module, wherein the starting method comprises steps below:
    S100: when the starting device is powered up, detecting whether a DC input voltage is present at an input side of the full-bridge inverter; if not, determining that the input side of the full-bridge inverter is abnormal; if present, proceeding to next step;
    S200: if the DC input voltage is present at the input side of the full-bridge inverter, the driving circuit being controlled by the single-chip microcomputer; within a set time length T0, continuously outputting a Pulse Width Modulation (PWM) waveform to regulate the full-bridge inverter continuously, according to a certain set period, so that the full-bridge inverter provides output to the CDM lamp;
    S300: determining, by the ignition determining module, whether the output provided by the full-bridge inverter within the time length T0 successfully ignites the CDM lamp, and outputting, by the ignition determining module, a result of the determining to the single-chip microcomputer, wherein the ignition determining module is disposed between the full-bridge inverter and the single-chip microcomputer, and the single-chip microcomputer, the ignition determining module and the full-bridge inverter are three separate and distinct components that are not integrated into one part;
    S400: if the single-chip microcomputer knows that the ignition succeeds through the step S300, controlling, by the single-chip microcomputer the driving circuit to regulate the output of the full-bridge inverter, so that the CDM lamp enters into a normal working state from a starting state;
    S500: if the single-chip microcomputer knows that the ignition failed through the step S300 and the DC input voltage is still present at the input side of the full-bridge inverter, the drive circuit being still controlled by the single-chip microcomputer; changing the previously set period, and continuously outputting, according to the changed set period within the time length T0, pulse of the period, so that the full-bridge inverter provides a new output to the CDM lamp; then, continuing to execute step S300; if the ignition determining module still determines that the ignition failed, executing step S600; otherwise, jumping to step S400;
    S600: accumulating the time length T0 in the executed step S500 and the time length T0 in the executed step S200, and determining whether the accumulated time length has exceeded a preset total time length T; if not, iteratively executing the step S500, wherein during each of the iteratively executing the step S500, an output voltage and an output pulse width of the full-bridge inverter are simultaneously raised so as to obtain an enhanced energy density for facilitating the ignition; the ignition determining module senses real-time current flowing through the CDM lamp to obtain real-time sampling data represented by the PWM waveform; a fuzzy operation is performed to obtain a fuzzy operation-processed waveform of sensed data obtained from the real-time sampling and to determine that a present CDM current represented by the fuzzy operation-processed waveform is in a state of being a corresponding value in a database; and the single-chip microcomputer emits a control signal to control the driving circuit after determining that the present CDM current is in the state of the corresponding value in the database;

otherwise, switching off pulse output of the driving circuit, confirming that a starting time-out fault is present, and transmitting an alert of starting time-out fault to the single-chip microcomputer.

8. The method according to claim 7, wherein the DC input voltage in the step S100 is provided through an output of the chopper circuit, and the single-chip microcomputer can regulate the output of the chopper circuit.

9. The method according to claim 7, wherein in step S300, when current flows through the CDM lamp, the ignition determining module can sense current flowing through the CDM lamp and/or obtain a tube voltage of the CDM lamp.

10. The method according to claim 7, wherein an input of the chopper circuit is a DC current, and the DC current is obtained through an output of the full-bridge rectifier.

11. The method according to claim 10, wherein the starting device further comprises a power factor correcting circuit, an input end of which is connected to an output end of the full-bridge rectifier, while a bus line voltage output end of which is connected to an input end of the chopper circuit; wherein the power factor correction circuit is controlled by the single-chip microcomputer.

12. The method according to claim 7, wherein the starting device further comprises: a fault displaying module which can display fault information to alert the user whether an input side of the full-bridge inverter has abnormalities in the step S100.

13. The starting device according to claim 5, wherein the single-chip microcomputer is directly connected to and configured to control each of the chopper circuit, the power factor correcting circuit, the full-bridge inverter and the ignition determining module.

14. The method according to claim 11, wherein the single-chip microcomputer is directly connected to and configured to control each of the chopper circuit, the power factor correcting circuit, the full-bridge inverter and the ignition determining module.

* * * * *